United States Patent
Favila et al.

(10) Patent No.: US 10,616,221 B2
(45) Date of Patent: Apr. 7, 2020

(54) SYSTEMS AND METHODS FOR ONLINE FRAUD DETECTION

(71) Applicant: TRANSFORM SR BRANDS LLC, Hoffman Estates, IL (US)

(72) Inventors: Angel Favila, Lake in the Hills, IL (US); Puneet Shivam, Schaumburg, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

(21) Appl. No.: 16/242,394

(22) Filed: Jan. 8, 2019

(65) Prior Publication Data

US 2019/0238540 A1    Aug. 1, 2019

Related U.S. Application Data

(63) Continuation of application No. 15/236,077, filed on Aug. 12, 2016, now Pat. No. 10,178,093.

(51) Int. Cl.
*G06F 7/04* (2006.01)
*H04L 29/06* (2006.01)
*H04L 29/08* (2006.01)
*H04W 4/70* (2018.01)

(52) U.S. Cl.
CPC .......... *H04L 63/0876* (2013.01); *H04L 67/10* (2013.01); *H04L 67/12* (2013.01); *H04L 67/32* (2013.01); *H04W 4/70* (2018.02); *H04L 67/06* (2013.01); *H04L 2463/121* (2013.01)

(58) Field of Classification Search
CPC ........... H04L 63/0876; H04L 2463/121; H04L 67/06; H04L 67/10; H04L 67/12; H04L 67/32; H04W 4/70
USPC ............................................................ 726/6
See application file for complete search history.

(56) References Cited

U.S. PATENT DOCUMENTS

| | | | | |
|---|---|---|---|---|
| 2007/0230390 A1* | 10/2007 | Takatani | ............... | H04J 3/1617 370/315 |
| 2012/0143759 A1* | 6/2012 | Ritorto, Jr. | ............. | G06Q 20/02 705/44 |
| 2013/0138967 A1* | 5/2013 | Auld | ..................... | H04L 9/3231 713/180 |
| 2013/0167196 A1* | 6/2013 | Spencer | .................. | H04W 8/22 726/3 |
| 2015/0100491 A1* | 4/2015 | Fote | ..................... | G06Q 20/322 705/44 |
| 2015/0332105 A1* | 11/2015 | Waters | ............... | G06K 9/00892 382/116 |
| 2016/0019546 A1* | 1/2016 | Eisen | ..................... | G06F 21/44 705/44 |

(Continued)

*Primary Examiner* — Samson B Lemma
(74) *Attorney, Agent, or Firm* — McAndrews, Held & Malloy, Ltd.

(57) ABSTRACT

Systems and methods for preventing fraud are disclosed. The system includes, for example, a front end device that is operatively coupled to a back end device. The front end device is configured to generate a first dynamic device identification based on dynamic device characteristics of the front end device. The back end device is configured to generate a second dynamic device identification based on the dynamic device characteristics of the front end device to authenticate the front end device. The front end device can also authenticate itself through an Internet of Things (IoT) device that has a trusted connection to the back end device.

5 Claims, 9 Drawing Sheets

(56) References Cited

U.S. PATENT DOCUMENTS

2017/0140379 A1* 5/2017 Deck .................. G06Q 20/4012
2018/0089685 A1* 3/2018 McGregor ......... G06Q 20/4016
2018/0262471 A1* 9/2018 Pereira ................... G06Q 20/12

* cited by examiner

SYSTEMS AND METHODS FOR ONLINE FRAUD DETECTION

RELATED APPLICATIONS/INCORPORATION BY REFERENCE

The present application is a continuation of U.S. application Ser. No. 15/236,077, filed Jan. 8, 2019, now issued U.S. Pat. No. 10,178,093. The above-identified application is hereby incorporated herein by reference in its entirety.

FIELD OF THE DISCLOSURE

Certain embodiments of the disclosure relate to systems and methods for fraud detection and, in particular, to fraud detection using device identifications generated in a stealth mode.

BACKGROUND OF THE DISCLOSURE

The number of U.S. data breaches tracked in 2015 totaled 781, the second highest total on record since the Identity Theft Resource Center (ITRC) began tracking beaches in 2005. These data breach targets included locations where high volume consumer data is stored. Further, several individual accounts were hacked that resulted in millions of combined losses. The data breaches potentially led to identity theft including the theft of social security numbers, financial account information, medical information, Internet of Things (IoT) product account information, email addresses, and passwords.

Through data breaches, hackers have access to full account information for online retailers, thereby allowing hackers to complete credit card purchases corresponding to those accounts without even having the credit cards. The total value of the card-not-present threat is expected to grow from $9 billion in 2013 to nearly $19 billion in 2018, while fraud at point of sale (POS) locations continues to shrink.

Data breaches can also occur when users are led to connect to the Internet through a wireless network controlled by a hacker, or when users fall prey to a phishing attack, a malware attack, or a man-in-the-middle (MITM) attack, and mistakenly give up personal data such as user identifications (user Ids), passwords, and/or device identification (device Ids). The hackers use this personal data for unauthorized purchases, thereby causing substantial personal losses.

Financial institutions are generally obligated to use multi-factor authentication (MFA). These institutions maintain a list of trusted devices that can access web sites or applications on mobile, desktop, tablet devices, etc. These device Ids are often shared across multiple applications, and there is the potential risk of knowing in advance the device Id that the user is using for another application. It is also possible to use some kind of social engineering attack to obtain access to a user Id, a password, and/or a device Id.

In banking, e-commerce, or other security sensitive applications, an ongoing need exists to validate device Ids along with user-Id-password combinations. Some banking applications employ machine learning based algorithms that are based on the parameters and/or attributes of the user device and perform a risk calculation of the user for that device Id to determine if the device can be trusted. This mechanism suffers from the drawback of accuracy due to the basic nature of the machine learning and still gives some leeway to an attacker performing a fraudulent transaction. The statistical models used by such mechanisms tend to be inaccurate and operate in a predictive- and/or pattern-based mode, and are tuned to generate alerts for a given percent of users. This results in a high rate of false positives and false negatives. Moreover, once this ratio is established, changes to the model are difficult and slow, constituting a significant barrier to rapid and effective handling in the evolving and constantly changing fraud landscape.

With the current use of device Ids/device fingerprinting, user Ids, and passwords, fraudulent transactions in an e-commerce or banking transaction are still possible. There are ways of performing MITM attacks and retrieving user Ids, passwords, and device Ids for sensitive security applications, or using citadel malware applications to imitate the usage patterns of users.

Further limitations and disadvantages of conventional and traditional approaches will become apparent to one of skill in the art, through comparison of such systems with the present disclosure as set forth in the remainder of the present application with reference to the drawings.

BRIEF SUMMARY OF THE DISCLOSURE

Systems and methods for fraud protection are provided substantially as illustrated by and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION OF THE DISCLOSURE

As utilized herein the terms "circuit" and "circuitry" refer to physical electronic components (i.e., hardware) and any software and/or firmware ("code") which may configure the hardware, be executed by the hardware, and/or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations.

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated.

Some embodiments according to the present disclosure provide systems and methods that avoid fraudulent transactions when primary device Ids, user Ids, and/or passwords for applications have been compromised.

Some embodiments according to the present disclosure provide systems and methods that pre-generate device Ids in a stealth mode at intervals (e.g., regular or irregular intervals) with the help of a downloaded algorithmic software (e.g., one or more algorithms written in an appropriate language such as java script, objective C, java, etc.) that can be executed on the device such as java-script, objective C, java, etc.), uses the characteristics of the device, generates a device Id corresponding to the algorithmic software, and sends it back to the web site and/or native application owner of the application.

Some embodiments according to the present disclosure provide systems, methods, and/or devices that do not permanently store the device Id generator software, which can be ephemeral, but do store device characteristics along with a date time stamp in a file, a cookie, a web storage, or a database, for example. The system can include a server, for example, that can store the device Id generator software component, the primary user device on which runs the software, and device characteristics that are periodically received from the device. The device on which runs the algorithm or software is identified by a primary device Id which is based on universally accepted static device characteristics such as, for example, international mobile station equipment identity (IMEI), hardware serial number, media access control (MAC) number or address, etc.

Some embodiments according to the present disclosure solve one or more problems that are created when a data breach or a device breach occurs, and/or when malware is installed on a device. As a result of such data or device breaches or malware, the combination of a user Id, a password, and/or a device Id can be compromised. User information can also be compromised by phishing attacks, social engineering tactics, reverse engineering applications, directly asking users to download applications and so on. One of the issues is that the user Id, the password, and the device Id are static and, once compromised, provide continued access to online bank accounts, trading accounts, retail accounts, etc. Access to such accounts allow for unauthorized e-commerce transactions to proceed and for many other unauthorized activities through IoT devices deployed at home, for example. Some embodiments according to the present disclosure overcome one or more of these problems by providing for a primary device Id and a secondary dynamic device Id that varies with time. The secondary dynamic device Id can be calculated on the user device to verify if it matches with an earlier calculated device id or a device id calculated by the back end using a downloaded software component and device characteristics. If the device id does not match, then the authentication is revoked and the user can be instructed to re-authenticate the device before allowing any security sensitive transactions like buying goods or services, or controlling another system or device (e.g., an IoT device).

Some embodiments according to the present disclosure provide a more accurate fraud detection scheme when compared to risk detection scheme used presently by e-commerce and financial institutions. The current risk detection schemes are limited to current static device characteristics, which are prone to generating false positives and negatives. Some embodiments according to the present disclosure provide for a secondary dynamic device Id that is used to detect a valid authenticated device. The user device downloads an algorithm to calculate the secondary dynamic device Id and then sends it to the application server. The application server calculates the dynamic device Id from the current and/or past dynamic device characteristics using a same or similar algorithm that was downloaded on the user device and compares the calculated dynamic device Id with the dynamic device id received from the user device. A match indicates an authorized user or device and a lack of a match indicates an unauthorized user or device. Some embodiments according to the present disclosure provide for using the combination dynamic device Id systems and/or methods with current risk detection schemes to eliminate false positives and negatives of using risk detection schemes alone. Some embodiments of the present disclosure provide for using the dynamic device Id systems and/or methods without current risk detection schemes to reduce false positives and negatives.

Some embodiments according to the present disclosure provide for authentication and/or re-authentication of user devices (e.g., mobile wireless devices) by sending one or more device Ids and dynamic device characteristics to a cloud network, for example, to authenticate the user device to communicate with a remote IoT device via the cloud network (e.g., the IoT cloud network). Further, some embodiments according to the present disclosure leverage that IoT devices are typically located in secure locations (e.g., a home, an office, etc.) and cannot be physically accessed by unauthorized users.

Some embodiments according to the present disclosure provide for the calculation of one or more device Ids based on different static device information (e.g., a MAC number, an IMEI number, a cell phone number, a serial number, a hardware model number, an operating system version, etc.). A short-lived software component can also be downloaded from a back end application and used to generate, for example, a dynamic device Id. After a few minutes, for example, the short-lived software component can be deactivated or deleted or its work space deleted. The device Id and/or the dynamic device Id can be used in device verification when security sensitive transactions are being performed (e.g., e-commerce transactions, banking transactions, IoT control operations, etc.).

Some embodiments according to the present disclosure provide a dynamic device Id tagged to (e.g., associated with) a device identified by a primary device Id (e.g., a static device Id). The dynamic device Id changes with time based on changes in device characteristics (e.g., past device characteristics and/or present device characteristics). For example, the dynamic device Id can change with device characteristics of the device at any event point (e.g., one or more points in time, one or more event occurrences, etc.) in the past and/or the present provided that the event point is also communicated to the back end application.

Some embodiments according to the present disclosure provide for downloading dynamic device Id generator software or algorithms that change (e.g., change with time, events, etc.) and perform a specific mathematical algorithm or computation on the user device using device characteristics (e.g., device characteristics based on one or more event points) of user device. The dynamic device Id is calculated by downloading a software component from, for example, the back end application (e.g., a back end application server) to the user device. The software component runs on the user device and uses some of the device characteristics (e.g., orthogonal device characteristics) to generate a dynamic device Id (e.g., a secondary dynamic device Id). As part of the security process, the application running on the device nullifies the local device memory or portions of the local device memory in which the downloaded software is stored for execution. The application running on the device (e.g., cell phone, tablet, etc.) keeps the back end synchronized with respect to the specific device characteristics that change. In some embodiments according to the present disclosure, the synchronization can happen, for example, multiple times in a week, day, hour, or some other time period, or when device characteristics change. The dynamic device Id generator software (e.g., secondary device Id generator software) downloaded to the device generates a new dynamic device id using some device characteristics identified by a time stamp, for example, that is sent to the back end along with dynamic device Id (e.g., the secondary device Id). The back end application uses the same dynamic device Id generator software used by the device and runs the dynamic device Id generator software using the same device characteristics as per the time stamp sent by device. The back end application then compares the secondary dynamic device Id generated at the back end application to the secondary dynamic device Id sent by device. If both of the secondary dynamic device Ids match, then the device is authenticated or re-authenticated. If the secondary dynamic device Ids do not match, then the device is not trusted.

Some embodiments according to the present disclosure employ device characteristics at one or more event points (e.g., points of time, event occurrences, etc.). Examples of device characteristics can include, for example, the time that the device was taken out of a charger; the time that a battery died or that the device shut down; a battery percentage at a specific date and time; percentage of hard disk usage at a specific date and time in terms of segments (e.g., 0 to 5%, 5% to 10%, 10% to 15%, etc.); number of applications installed at a specific date and time; number of applications running on the device at a specific date and time; amount or percentage of memory used at a specific date and time; screen saver being at a specific date and time; number of camera pictures or videos stored on the device at a specific date and time; the particular application being used at a specific time on the device; when a particular application was installed or uninstalled; the time that the last call was initiated from device; most frequent phone number dialed for a particular duration (e.g., a week) at a specific date and time; etc.

Some embodiments according to the present disclosure provide a large selection of dynamic device Id generator software. For example, the back end application can include a repository in which is stored a large number of different dynamic device Id generator software. Different dynamic device Id generator software can be created by using different characteristics, different seeds (e.g., a random 256 bit seed), and/or different mathematical operations. The mathematical operations can include, for example, a left shift of bit x by y, a right shift of bit y by z, an addition and/or subtraction of a number, etc. The back end can also select from a list of different device characteristics that can be used by the core piece of software to generate a large number of different dynamic device Id generator software components. For example, a particular dynamic device Id generator software component can be a combination of a core software piece, a 256 bit seed per user, a randomly chosen device characteristic, and a mathematical operation. Thus, there is a sufficiently large number of possible combinations of dynamic device Id generator software to make it nearly impossible to compromise all the software components on the client side. To compromise the system, the device characteristics and the software downloaded from the back end application, at the least, are needed to be able to break the dynamic device Id.

Some embodiments of the present disclosure provide a dynamic device Id for authenticating devices and, in particular, when a username and password (e.g., for an email account) has been compromised by a hacker or a user that was previously, but no longer is, authorized. By using the compromised username and password, hackers can not only reset IoT device accounts, but can also control them through a separate device and account. Some embodiments of the present disclosure provide that current dynamic device Ids generated on the application running on the user device are used for device authentication and may be referred to as an authentication device Id, for example. The authentication device Id can be input to the IoT product (e.g., via a user interface of a refrigerator, an e-safe, an e-lock, etc.), which has a trusted connection to the cloud network (e.g., the IoT cloud network). The IoT product can send this information to the cloud network, and the user device can separately send its authentication device Id to the cloud network. The cloud network can confirm the authentication device Id by comparing the authentication device Ids received from two different sources. If authenticated, the user device can use the IoT product for future usage, for example, of the IoT cloud network (e.g., to remotely access other IoT products). This process ensures that the user is in proximity to the IoT product, thereby ensuring legal and valid access. Some embodiments of the present disclosure provide that one or more of the IoT products include a gateway or a web server that provides a user interface (e.g., graphical user interface, a web site, etc.) to authenticate user device by remotely inputting the authentication device Id to the gateway or the web server of the IoT product. The authentication device Id can also be entered from another application or web site on a trusted device. This application or web site may be referred to as a companion application or web site that is associated with the cloud network that receives the authentication device Id.

Figure 1:
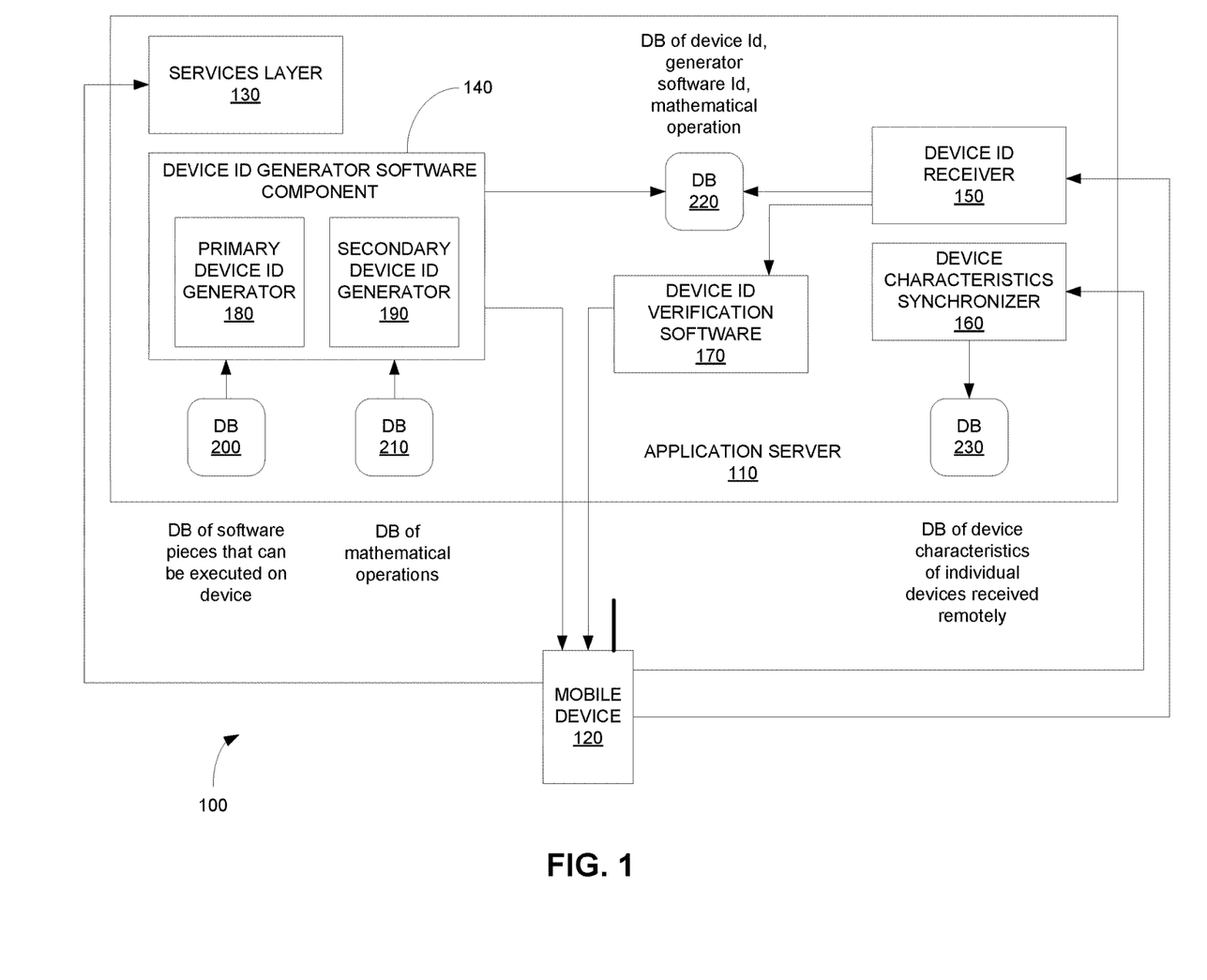
FIG. 1 shows a dynamic device Id system according to an embodiment of the present disclosure.

FIG. 1 shows a dynamic device Id system according to an embodiment of the present disclosure. The dynamic device Id system 100 includes, for example, an back end application server 110 and a front end client device or user device such as a mobile device 120. The application server 110 can include, for example, a services layer 130, a device Id generator software component 140, a device Id receiver 150, a device characteristics synchronizer 160, device Id verification software 170, and a plurality of databases. The device Id generator software component 140 includes, for example, a primary device Id generator 180 and a secondary device Id generator 190. The plurality of databases, which can be collectively referred to as the database, include, for example, a database 200 of software pieces that can be executed on the user device; a database 210 of mathematical operations; a database 220 of a device Id, a generator software Id, and a mathematical operation; and a database 230 of remotely transmitted device characteristics of individual devices.

The application server 110 is configured to host the back end solution for the application running on the mobile device 120 or other types of user devices or client devices. The application server 110 can be accessed via wired and/or wireless networks (e.g., the Internet, Ethernet, private networks, public networks, cellular networks, wireless networks, cables, wires, etc.). The application server 110 can be accessed by or can provide a web site user interface, for example.

The application or software running on the application server 110 employs the device Id generator software component 140 and the databases 200, 210 to generate the device Ids.

In some embodiments, the device Id generator software component 140 includes, for example, a set of orthogonal software components, a set of mathematical operations, and a 256 bit seed to calculate device Ids. The 256 bit seed provides enough randomness such that there is close to a one-to-one correspondence between a user device 120 and the device Id generator software component 140. When a primary device Id (e.g., a static device Id) or secondary device Id (e.g., a dynamic device Id) for the user device 120 is to be calculated, the software component is downloaded to the user device 120 for calculation of the device Id and is a combination of at least software to calculate the device Id, a mathematical operation selected (e.g., randomly selected) for the user device 120, and the 256 bit seed.

The database of the application server 110 stores a database collection that includes a user Id, a primary device id (e.g., a device authentication Id), a software Id of the primary component of the software to uniquely identify the software component used to generate the device Id, a mathematical operation Id used to calculate the primary device Id, a device characteristics Id, and a seed used to generate the primary device Id. The database collection also includes a secondary device Id, a software Id of the primary component of the software, a mathematical operation Id used to calculate the secondary device Id, and a seed used to calculate the secondary device Id.

The database can also include another database collection that includes the user Id and the device characteristics Id (e.g., a battery charge, time and location coordinates, each identified by a unique Id and a date time stamp for a user). There database collection can be associated with a particular datetime stamp for a user. The data can be stored for a configurable period of time. The period of time can be, for example, randomly chosen between 1-10 days on the days when the application was running on the device and reporting device characteristics. Some past device characteristics can be used at a later stage to calculate a device Id. The same database collection can also be stored on the device side.

The primary device/device authentication Id generator software piece can include, for example, an executable piece of script or software done in java, javascript, swift, or objective c that, when run on any device, picks up a few device static characteristics of the user device. The device id generator software runs a specific mathematical calculation on a number containing a representation of the device characteristics and generates a device Id. Each device Id generator software is represented by a unique identifier which is maintained on the server side for identifying the software component. If the device Id generator is downloaded and run on the user device, it will generate a unique authentication device Id which can also be referred to as a primary device Id. The primary device Id generator software can rely on relatively static device characteristics such as a telephone number, an IMEI, a MAC, an address, etc. The primary device Id can be saved on the device to a file or to a database along with device characteristics used to generate it. This same device Id can also be used to authenticate the device through a trusted mechanism such as entering the same device Id on an IoT product or a trusted companion web site with ties to the application cloud, retail kiosk, bank terminal, etc.

The secondary device Id generator software piece can include, for example, an executable piece of script or software in java, javascript, swift, or objective c, for example, that when run on a user device picks up a few characteristics of the user device such as, for example, hard disk usage (e.g., whether hard drive is more than 50% full, less than 50% full, or falls in a particular range) and uses the device characteristics to generate a secondary device Id. The secondary device Id generator software can generate a secondary device Id that is based on curent static characteristics of the user device and/or based on past device characteristics of the user device. The device characteristics can be based one or more characteristics based on device events, time and space device characteristics, etc.

In some embodiments, the secondary device Id generator software piece can include, for example, a secondary device Id generator. The secondary device Id generator can generate a secondary device Id using static device characteristics, for example. The particular algorithm performs a specific mathematical calculation on a number representing the device characteristics and generates a secondary device Id. Each secondary device Id generator software component is represented by a unique Id that is maintained on the server side for identifying the software component. It is this secondary device Id algorithm that is downloaded to the user device that is used to generate the device Id and send the generated secondary device Id to the application server. Each device Id generator software component can have multiple secondary device identification generator software pieces. The application determines whether to use a secondary device Id with only static characterisitics in isolation or in combination with dynamic device Id characteristics.

In some embodiments, the secondary device Id generator can generate a device Id based on past-in-time device characteristics. The secondary device Id generator executes a particular algorithm that performs a specific mathematical calculation on a number that represents past device characteristics and generates a secondary device Id. Each algorithm is represented by a unique algorithm Id that is maintained on the server side for identifying the particular algorithm. It is this secondary device Id algorithm that is downloaded to the user device to generate the secondary device Id and send the secondary device Id to the application server.

The user device can maintain some past characteristics of device based on location and time (e.g., on mm/dd/yy hh:mm:ss, the device Id was at location aa.bb and -cc.dd, or on mm/dd/yy hh:mm:ss, the hard disk usage was vv.vv % or battery charge was less than yy %). In some embodiments, the past characteristics can have a random aspect such as randomly choosing a date or time within a particular time range. The information related to the past characteristics can be stored persistently on the user device in a file or database format. Thus, once the application running on the user device decides to store some past device characteristic at some particular point in time, the information is stored not only on a local file, cookie, database, and/or web storage, but the application also sends the same information to the back end server so that the back end server can perform the calculation of device Id at a later point of time (e.g., when authenticating a device).

In some embodiments, the back end application server uploads the software piece on the user device, or the user device downloads the software piece from the back end application server for calculating a device Id on the user device. The same software piece on the back end is used to calculate the device Id based on the device characteristics, previously sent by the user device, and based on a time stamp sent by user device along with device Id. If the device Id calculated by the back end and the device Id calculated by the user device (e.g., a mobile device) are same, then this is a factor in favor of successfully authenticating the user device.

The application running on the user device has the capability to send device characteristics either to the application server (e.g., owned by the application owner) or a common place such as an application store (e.g., Google Play) from which this information is accessible to other applications. The application stores one or more device characteristics over a period of time which can be used by the back end for calculating the secondary device Id. When the application performs revisions to the file containing the device characteristics maintained on the user device such as removing some device characteristics on a periodic basis, the back end application server is informed of the revisions. Thus, the device characteristics stored on the user device and the back end are synchronized. In some embodiments, a browser or an operating system of the user device saves the device characteristics information on the device, makes the information accessible to the application running on device, and sends the information to a common back end such as, for example, an application store which can be used by back end applications to access relevant device characteristics information. The application running on the user device also determines which device characteristics to save based on the device Id generator software, downloaded from the back end to the front end application on the device, and the type of parameters selected for device Id generation.

The application running on the user device can be configured to periodically update the application server. The length of the period can be based, for example, on the device usage and how fast device characteristics change. In case of applications frequently used, the device characteristics can be transferred to the back end on top of (e.g., piggy backed on) any request made from application on the device to the back end.

The application running on the user device includes a software component that determines which the device characteristics to monitor and how to monitor the device characteristics. For example, the software component can monitor the change in value of device characteristics below and above a selected threshold. In another example, the software component can capture potentially orthogonally unique device characteristics such as, for example, place and time of most frequently called phone number, or number of calls received from the most frequent phone number in a particular period of time (e.g., selected period of time). In yet another example, the software component can monitor the deltas in device characteristics on a configured periodic basic, which can be checked against a particular threshold and, if certain criteria are met, then to write the device characteristics to a file on user device and send the written device characteristics back to application server. The software component can monitor other device characteristics or events happening on the user device which can be deemed to be unique. Examples of such device characteristics include, for example, the time and/or place when concurrent calls, emails, notifications, messages, or device events occur.

Figure 2:
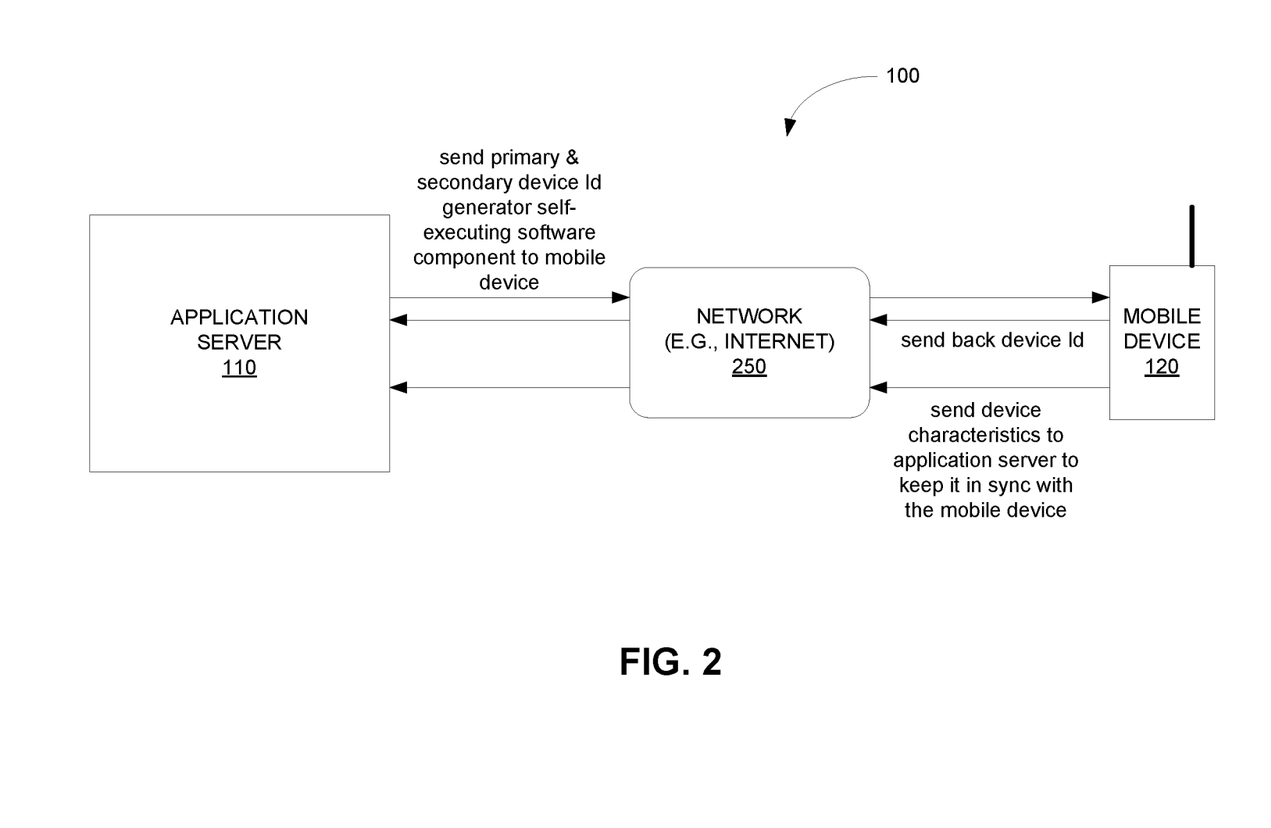
FIG. 2 shows a system for authenticating a user device according to an embodiment of the present disclosure.

FIG. 2 shows a system for authenticating a user device according to an embodiment of the present disclosure. Referring to FIG. 2, the system 100 includes the application server 110 in the back end and the mobile device 120 in the front end that communicate with each other via a network 250. The network 250 can be any combination of wired and/or wireless networks and links. For example, the network 250 can include the Internet or can be part of a cloud network.

In operation, the application server 110 sends to the mobile device 120, or the mobile device 120 downloads from the application server 110 a device Id generator software component. The device Id generator software component can include self-executing software for the primary device Id generator and the second device Id generator. The device Id generator software component is executed on the mobile device 120. In some embodiments, based on static device characteristics, the device Id generator software component, in particular, the primary device Id generator generates a primary device Id; and, based on dynamic device characteristics, the device Id generator software component, in particular, the secondary device Id generator generates a secondary dynamic device Id. The primary device Id and/or the secondary device Id are then sent to the application server 110 via the network 250. The mobile device 120 also monitors and stores device characteristics such as dynamic device characteristics that change over time for use with the generation of the secondary device Id. The mobile device 120 also sends (e.g., periodically sends) the stored device characteristics to the application server 110. The application server 110 also stores the device characteristics received from the mobile device 120. Using the same device Id generator software component, the application server 110 can generate the primary device Id and/or the secondary device Id based on the received device characteristics. The application server 110 can then compare the received device Id with the locally generated device Id to authenticate the mobile device 120.

Figure 3:
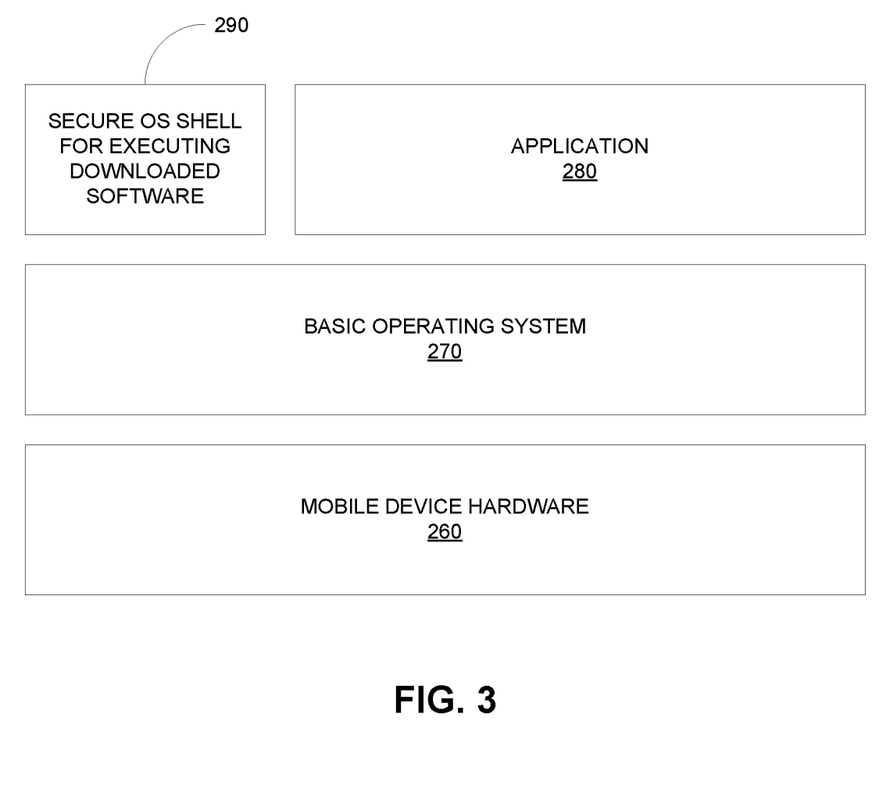
FIG. 3 shows hardware and software components of the user device according to an embodiment of the present disclosure.

In some embodiments, the user device can include an operating system that is capable of executing scripts and/or software components in a sandboxed shell environment. Referring to FIG. 3, an embodiment of the user device (e.g., mobile device 120) is shown in which an operating system 270 is running on the hardware 260 of the mobile device 120. The hardware 260 can include, for example, one or more processors, circuits, and/or non-transitory memories operatively coupled for storing and executing processor-executable instructions and/or for storing information. The application 280 and the secure operating shell 290 for executing the downloaded software run on top of the operating system 270.

In the sandboxed shell environment, no modification of any file system can be performed, no network connection can be made, and the processor, memory, and other resources are curtailed or limited. The software or scripts can execute with the least privileges. By operating in a sandboxed shell environment, some embodiments can prevent other native services or applications from calculating the device Id using the downloaded software component and based on device characteristics at a specific time. In some embodiments, a system level application program interface (API) is provided by a native operating system that executes the API in a least privileged manner. In some embodiments, the device Id generator software component can be executed under a webview and then dynamically loaded software can be executed in least privileged manner.

Figure 4:
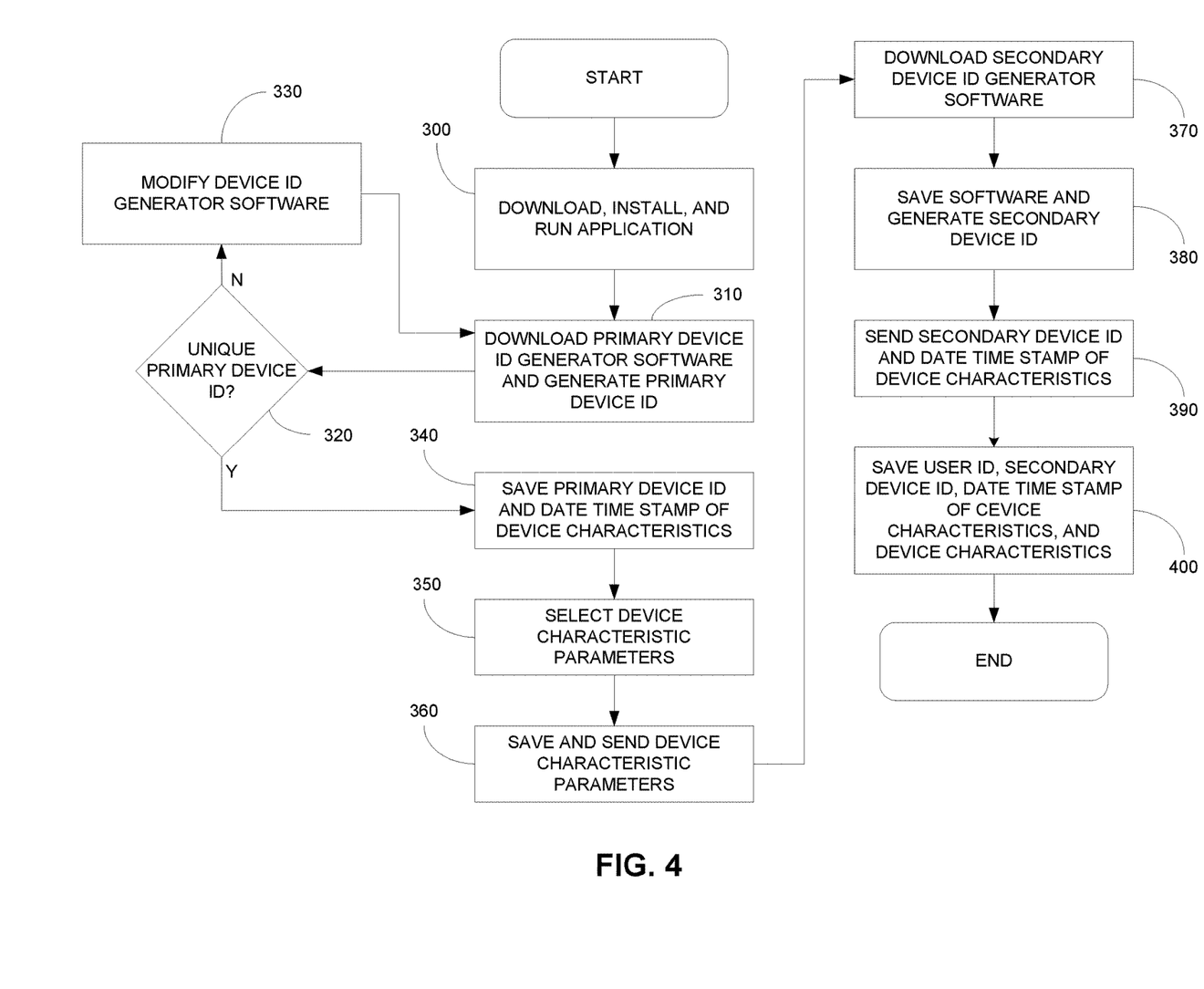
FIG. 4 shows a process for setting up the application according to an embodiment of the present disclosure.

FIG. 4 shows a process for setting up the application according to an embodiment of the present disclosure.

In step 300, a user downloads an application from an application store and installs the application on the user device. The application then runs on the user device.

In step 310, the back end application downloads primary device Id generator software onto the user device to generate a unique device Id that is referred to as a primary device Id. A request can be generated from the application to generate the primary device Id or the back end can connect to the application to generate the primary device Id. The device Id should be unique with respect to the user for the application on that user device.

In query 320, the back end application checks whether the primary device Id is unique to the user device and the application. If not, then in step 330, the back end application modifies the primary device Id generator software by changing the mathematical operation or selects different primary device Id generator software with a different mathematical operation. The process then goes back to step 310. If in query 320, it is determined that the primary device Id is unique to the user device and the application, then the process proceeds to step 340.

In step 340, the back end application saves the primary device Id along with the date time stamp of the device characteristics used to generate the primary device Id. The primary device Id along with the date time stamp is returned by the application to the back end application.

In step 350, the back end application selects one or more device characteristic parameters from a predefined set of parameters and communicates the selection to the application running on the user device to monitor and update the back end application on any changes to the selected parameters.

In step 360, the application running on the user device saves the device characteristic parameters with the date time stamp for a configurable period of time in a file in the native application directory or in a web storage. The application also sends these parameters to the back end application at regular predefined intervals.

In step 370, the back end application downloads the secondary device Id generator software onto the user device. The secondary device Id generator software downloaded can be selected from a predefined set of different secondary device Id generator software.

In step 380, the application that runs on the device saves the downloaded secondary device Id generator software in local memory which is cleared once the secondary device Id is generated. The downloaded secondary device Id generator software uses (e.g., randomly selects and uses) device characteristics that were saved in a file to generate the secondary device Id. In one example, the downloaded secondary device Id generator software uses the last saved device characteristics in the file to generate the secondary device Id.

In step 490, the application running on the user device sends back the secondary device Id generated by the downloaded software (e.g., the secondary device Id generator software) along with the date time stamp of the device characteristics of the device that were used to generate the secondary device Id.

In step 400, the back end application saves the user Id, the secondary device Id, the date time stamp of the device characteristics that were used, and the device characteristics that were used.

Figure 5:
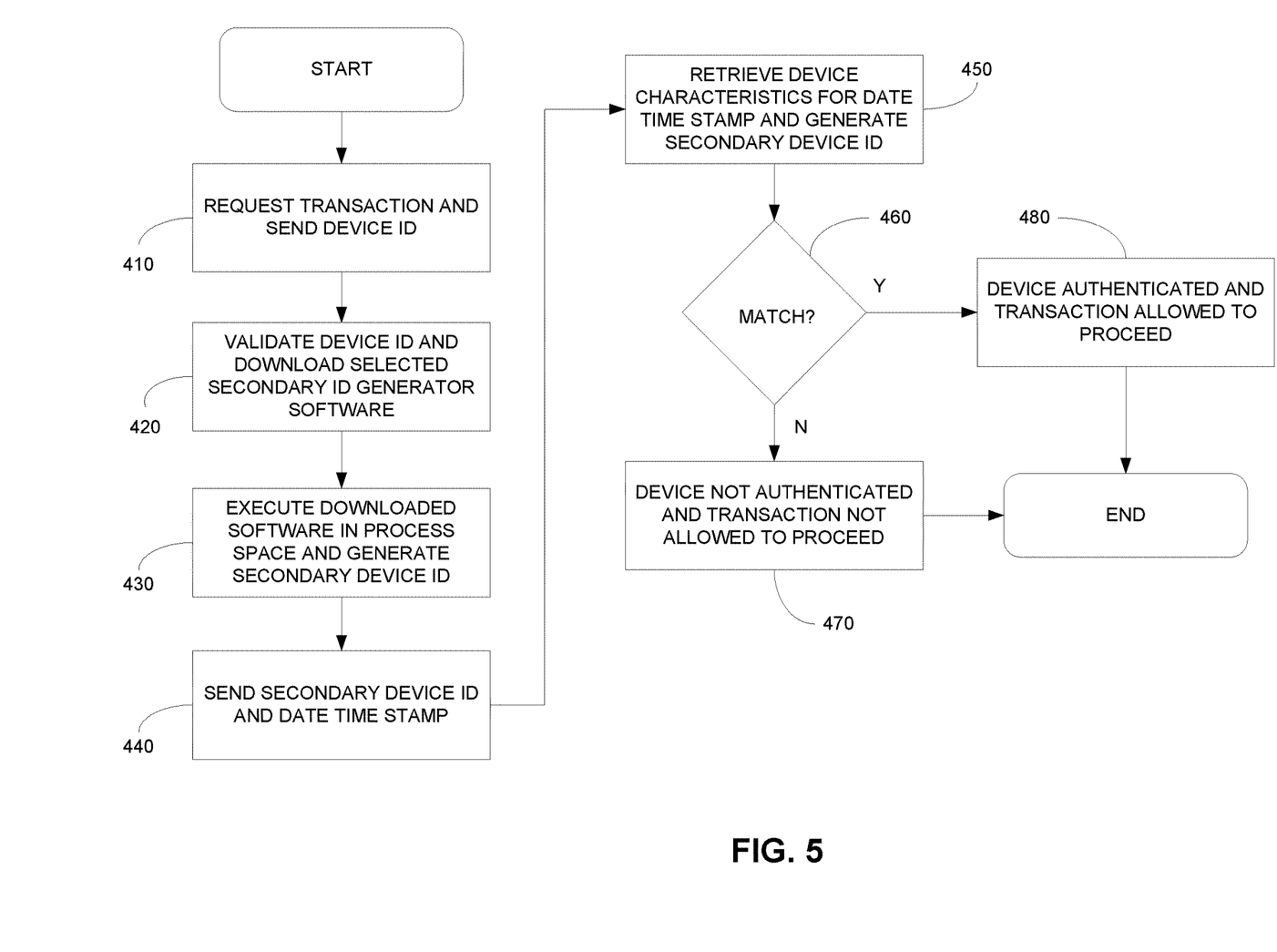
FIG. 5 shows a process for performing an application security-sensitive transaction according to an embodiment of the present disclosure.

FIG. 5 shows a process for performing an application security-sensitive transaction according to an embodiment of the present disclosure.

In step 410, the application on the user device requests to perform a transaction (e.g., an application security-sensitive transaction) and sends a primary device Id with other authentication parameters.

In step 420, the back end application validates the primary device Id and selects (e.g., randomly selects) a secondary device Id generator algorithm from a plurality of second device Id generator algorithms corresponding to the primary device Id and the user or user Id. The back end application then downloads the selected secondary Id generator software component onto the user device on which the application is running.

In step 430, the downloaded secondary device Id generator software is executed in a process space of the native application running on the user device.

In step 440, the application on the user device sends the secondary device Id generated by the downloaded secondary device Id generator software and the date time stamp of the device characteristics to the back end application. The application on the user device uses the date time stamp (e.g., a random date time stamp) of the device characteristics, which have been marked to be synchronized with the back end application.

In step 450, the back end application receives the secondary device Id along with the date time stamp of the device characteristics. The back end retrieves the device characteristics from its database corresponding to the given date time stamp, runs the specified secondary device Id generator software, and calculates the second device Id on the back end side.

In query 460, the back end application determines if the secondary device Id generated by the front end (e.g., the user device) matches the secondary device Id generated by the back end (e.g., the server).

If there is no match, then in step 470, the user device is not authenticated. The user is informed that measures predefined to authenticate the user device are to be followed. Further, the user device is not allowed to proceed with the transaction. This can be based on a configurable number of attempts allowed.

If there is a match, then in step 480, the user device is authenticated, and the user device or front end is allowed to proceed with the transaction (e.g., a business transaction).

Figure 6:
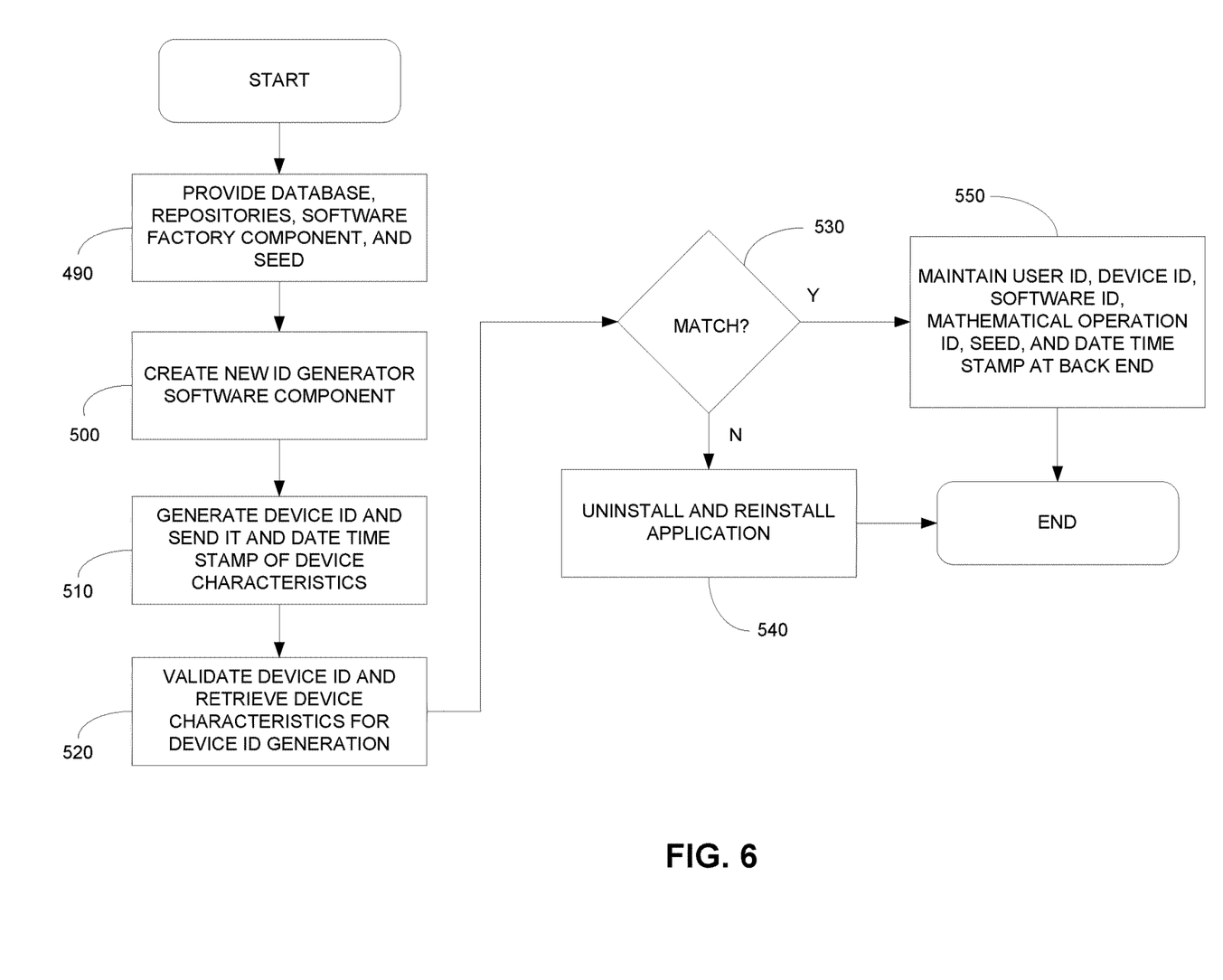
FIG. 6 shows a method for providing device Id generator software according to an embodiment of the present disclosure.

FIG. 6 shows a method for providing device Id generator software according to an embodiment of the present disclosure.

In step 490, the back end application has a database, a repository of software to calculate device Id, a repository of mathematical operations, a software factory component that can pick up any mathematical operation, and a seed such as a 256 bit seed to create a new software for device Id generation.

In step 500, the application at the back end uses the software factory component to create a new device Id generator software component, which is downloaded to the user device from the back end.

In step 510, the user device on which the application runs uses the downloaded device Id generator software component to generate the device Id using specific device Id characteristics. The user device then sends the device Id and the date time stamp of the device characteristics that were used to generate the device Id.

In step 520, the application at the back end receive the device Id and checks the validity of the device Id by running the same device Id generator software that was downloaded to the user device with the given device characteristics as specified by the date time stamp. The application at the back end retrieves the device characteristics based on the user Id and the date time stamp of the device characteristics received from the user device, and generates its own device Id.

In query 530, the application at the back end checks if the device Id sent by the front end (e.g., the user device) matches the device Id calculated by the back end (e.g., the back end server).

If there is no match, then in step 540, the user is informed that there is something wrong with the application setup and the application has to be uninstalled and reinstalled on the user device.

If there is a match, then in step 550, the application at the back end maintains in the database, the database collection including, for example, the user Id, the device Id, the software component Id, the mathematical operation Id, the seed (e.g., a random seed) used to generate the device Id (e.g., the secondary device Id), and the date time stamp of the device characteristics that were used to generate the device Id.

Figure 7:
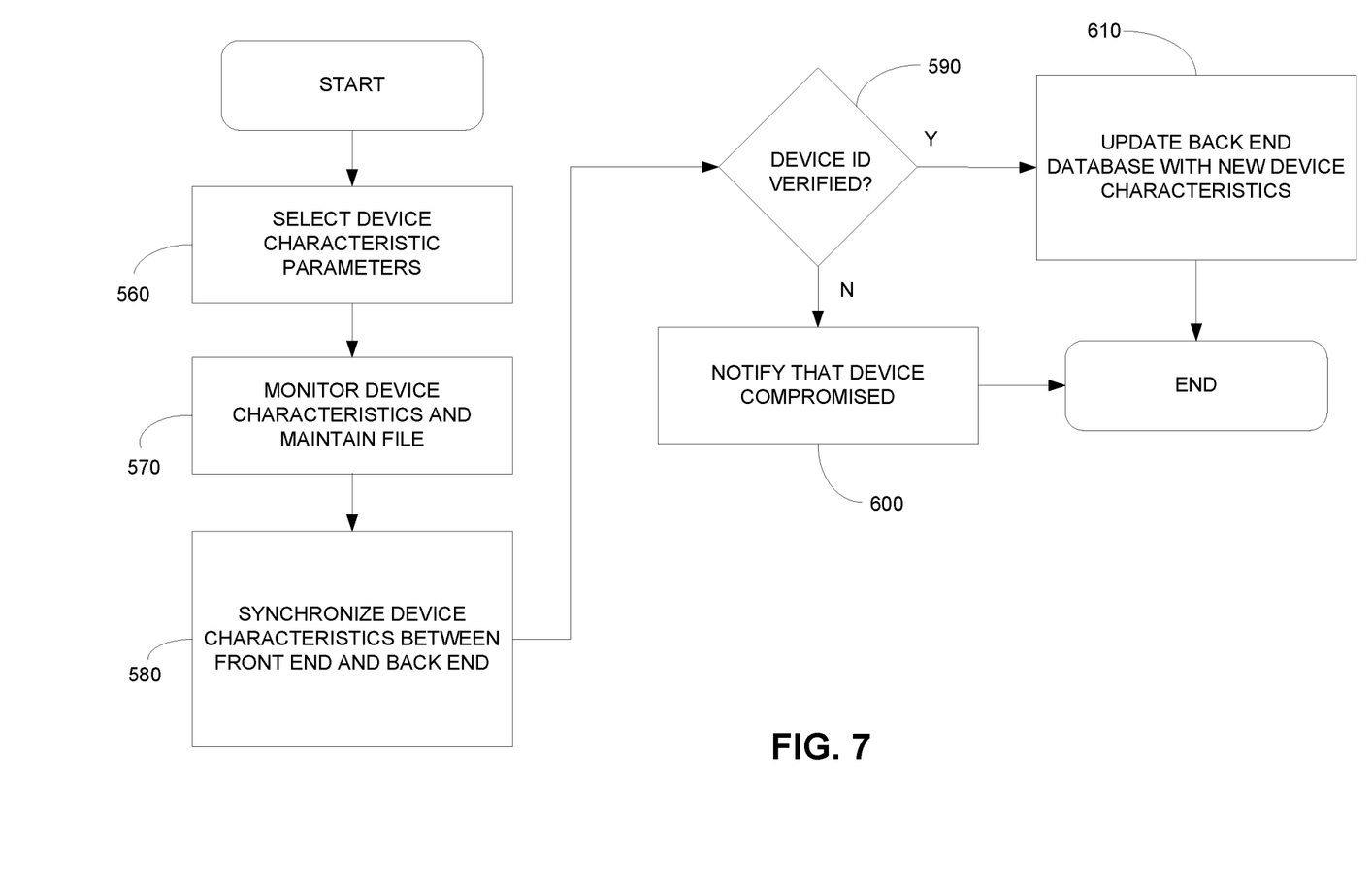
FIG. 7 shows device characteristic data synchronization according to an embodiment of the present disclosure.

FIG. 7 shows device characteristic data synchronization according to an embodiment of the present disclosure.

In step 560, the application at the front end selects a few device characteristic parameters that are used for device Id generation in the front end and the back end.

In step 570, the application running on the device as a front end native application monitors for changes in the device characteristics on a configured regular basis. The application stores (e.g., writes) a data time stamp along with the associated device characteristics including the initial device characteristics. Then any change (e.g., any change above a threshold) in the device characteristics is also stored along with the corresponding data time stamp. The same format can be used in both situations with respect to storing the information in the file.

In step 580, the application on the front end (e.g., the application running on the user device) sends changes in the device characteristics to the back end application where it is stored in a back end file with the corresponding date time stamp in a similar fashion as the front end file. Once the application at the front end receives acknowledgement that the back end has received the device characteristics, the front end marks the device characteristics in the front end file as synchronized with the back end file. The user device in the front end can pick up one or more of these synchronized device characteristics for device Id generation.

In query 590, the application at the back end determines (e.g., verifies) if the device Id received from the front end user device is correct as of the given date time stamp.

If the device Id is not verified, then in step 600, the application at the back end informs the user that the user device has been compromised and that the application has to be re-authenticated.

If the device Id is verified, then in step 610, the application at the back end updates its database with the new device characteristics.

Figure 8A:
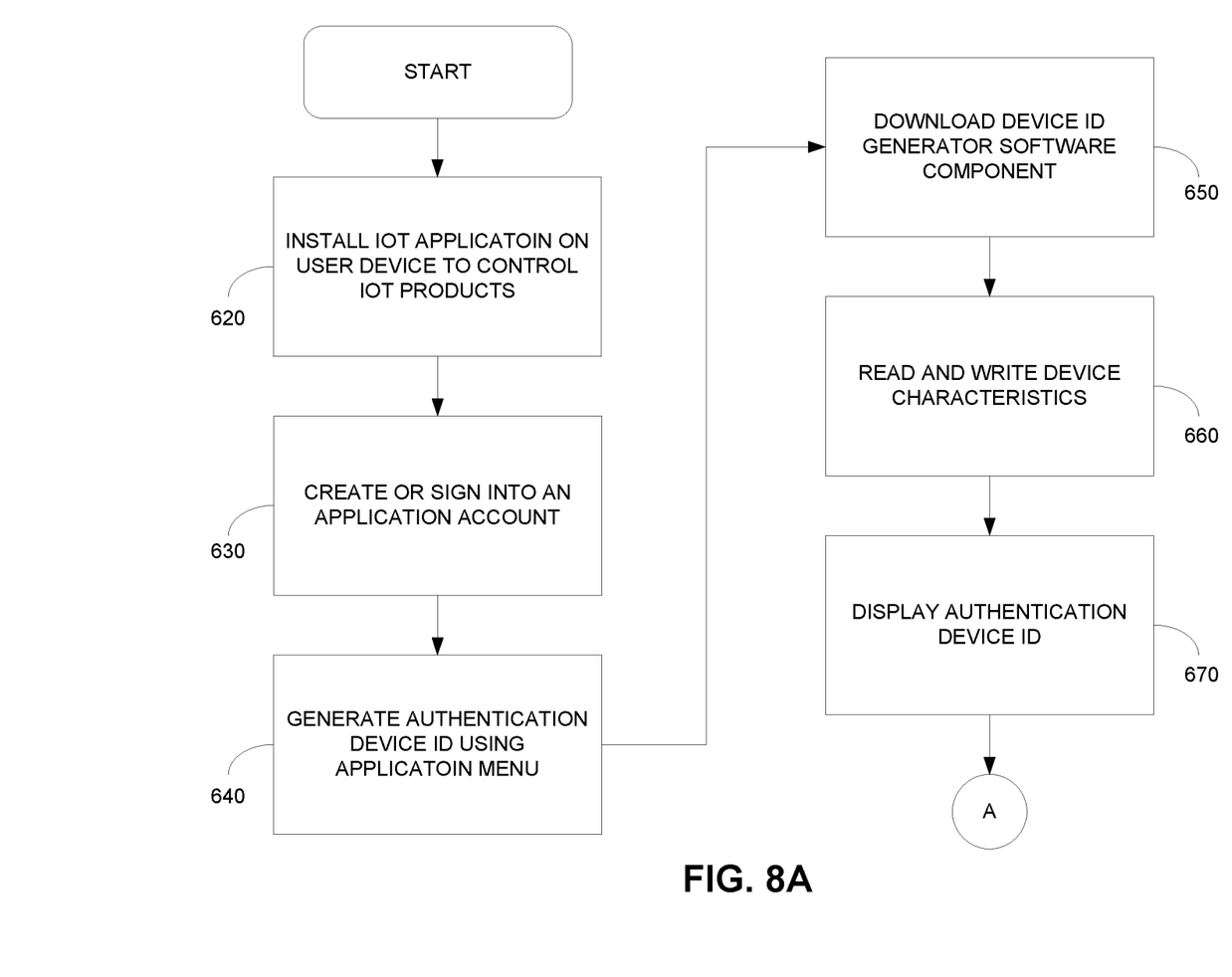
FIGS. 8A-B show user device authentication according to an embodiment of the present disclosure.
Figure 8B:
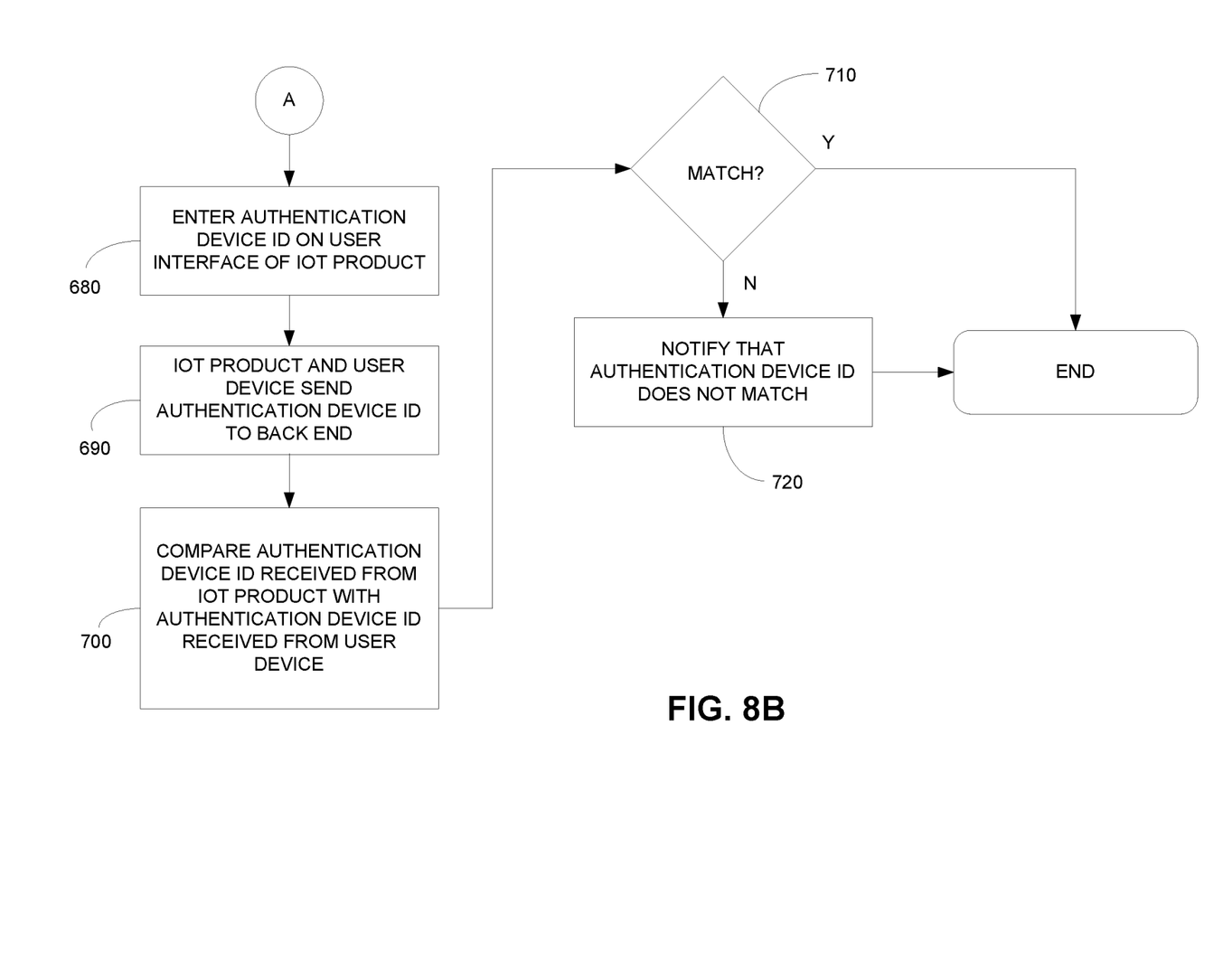

FIGS. 8A-B show user device authentication according to an embodiment of the present disclosure. In some embodiments, the user device authentication relates to an IoT cloud network, e-retail networks, and/or e-bank networks, for example.

In step 620, an IoT application (or e-retail application, e-bank application, etc.) is installed on a user device which can be used to control IoT products. The IoT products provide a trusted link between the IoT products and the cloud network (e.g., the IoT cloud network).

In step 630, the front end application is used to create an application account or to sign in (e.g., log in) to an existing application account.

In step 640, the user uses the application (e.g., via a menu of options provided by the application) to generate an authentication device Id.

In step 650, the front end application sends a request to the back end application to download the device Id generator software component. The back end application running on a server downloads the device Id generator software component to the front end application running on the user device.

In step 660, the front end application reads the device characteristics from the user device and writes the device characteristics along with the corresponding date time stamp to a persistent or semi-persistent storage (e.g., non-transitory memory or storage).

In step 670, the front end application displays the authentication device Id.

In step 680, the user reads the displayed authentication device Id and enters it via a user interface (e.g., a physical display) of the IoT product. In some embodiments, the user goes to a bank or retail kiosk to enter the authentication device Id in the user account. In other embodiments, the user enters the authentication device Id for the user account on a companion, highly secure, trusted web site like a bank web site that has ties with the IoT cloud network (or e-retail cloud network, online social media network, etc.). The user can also remotely enter the authentication device Id using a remote user interface provided by one or more IoT products, for example.

In step 690, the IoT product (or retail kiosk, bank terminal, etc.) sends the received authentication device Id to the cloud network back end. The user device also sends (e.g., concurrently sends) the authentication device Id to the cloud network back end.

In step 700, the back end application compares the authentication device Id received from the user device and the authentication device Id received from the IoT product (or retail kiosk, bank terminal, ATM kiosk, third-party companion trusted web site, etc.).

In query 710, the back end application determines whether there is a match between the authentication device Ids received from different sources.

In step 720, if there is no match, then the user device has not been authenticated. The back end application informs the user that the user device Id does not match and that the user should try again.

If there is a match, then the user device is authenticated.

Some embodiments of the present disclosure provide technical solutions to Internet-based problems. For example, the accessing of static user Ids, user names, and passwords through Internet-based attacks is overcome by some embodiments of the present disclosure by providing for a dynamic user Id.

Some embodiments of the present disclosure provide technical solutions to e-commerce problems that did not exist in a pre-Internet environment. Thus, for example, the hacking of online accounts by Internet-based attacks that allow of unauthorized purchases even without the credit card in hand is overcome by some embodiments of the present disclosure.

Some embodiments of the present disclosure provide for an improvement in the technical field of cybersecurity that did not exist in a pre-Internet environment. Thus, by providing for a dynamic user Id, some embodiments of the present disclosure provide for fraud detection that is not prone to false negatives and false positives as are current risk detection schemes.

Some embodiments of the present disclosure transform the state of the user device by authenticating the user device using an authentication device Id and/or a secondary dynamic device Id.

Other embodiments of the present disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for a reflection coefficient reader.

Accordingly, aspects of the present disclosure may be realized in hardware, software, or a combination of hardware and software. The present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system, comprising:
   a front end device operatively coupled to a back end device,
   wherein the front end device is configured to generate a first dynamic device identification based on dynamic device characteristics of the front end device,
   the back end device is configured to generate a second dynamic device identification based on the dynamic device characteristics of the front end device to authenticate the front end device;
   wherein the front end device is configured to download a device identification generator component from the back end device, the back end device selects the device identification generator component from a repository of a plurality of device identification generator components;
   and wherein each device identification generator component is different, and at least some of the device identification generator components have different combinations of seed numbers and device characteristics.

2. The system according to claim 1, wherein the dynamic device characteristics change with time.

3. The system according to claim 1, wherein the front end device is configured to download an application from the back end device, and the downloaded application generates the first dynamic device identification based on the dynamic device characteristics of the front end device.

4. The system according to claim 3, wherein the back end device uses the same application to generate the second dynamic device identification based on the dynamic device characteristics of the front end device.

5. The system according to claim 1, wherein each device identification generator component is different, and at least some of the device identification generator components have different combinations of device characteristics and mathematical operations.

* * * * *